United States Patent
Messick

[15] 3,649,897
[45] Mar. 14, 1972

[54] MOTOR ARMATURE CURRENT LIMIT SYSTEM
[72] Inventor: Mikel Jay Messick, Chagrin Falls, Ohio
[73] Assignee: Square D Company, Park Ridge, Ill.
[22] Filed: Oct. 22, 1970
[21] Appl. No.: 83,073

[52] U.S. Cl. .............................................318/434, 318/308
[51] Int. Cl. ..........................................................H02p 5/06
[58] Field of Search..................318/434, 308, 257, 258, 269, 318/271, 375, 376, 379, 380

[56] References Cited

UNITED STATES PATENTS 3,508,132   4/1970   Peterson ...........................318/308 X Primary Examiner—J. D. Miller
Assistant Examiner—Robert J. Hickey
Attorney—Harold J. Rathbun and Richard T. Guttman

[57] ABSTRACT

The system allows maximum acceleration and deceleration of a constant field motor and prevents commutator flashing during forward and reverse motoring and plugging operations. Positive and negative standstill current limits and acceleration and deceleration current limits are independently adjustable for optimum motor operation.

7 Claims, 6 Drawing Figures

INVENTOR.
MIKEL JAY MESSICK
BY Harold J. Rathbun
Atty.

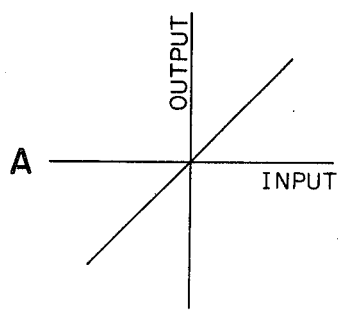
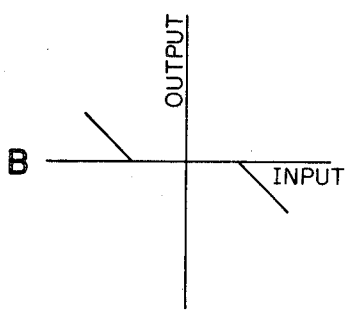
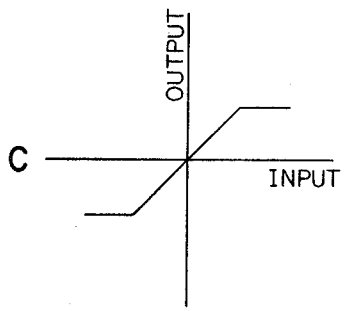
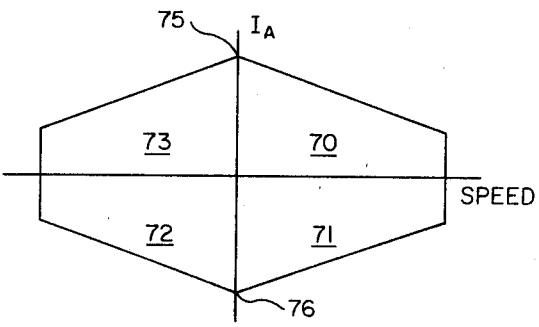
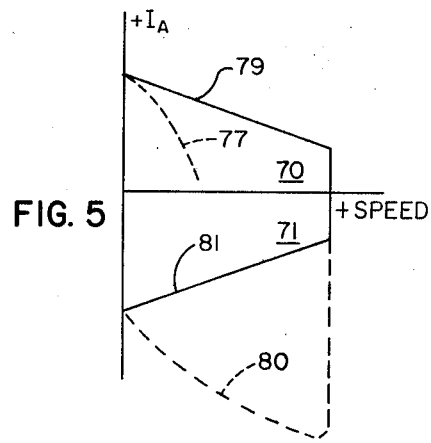
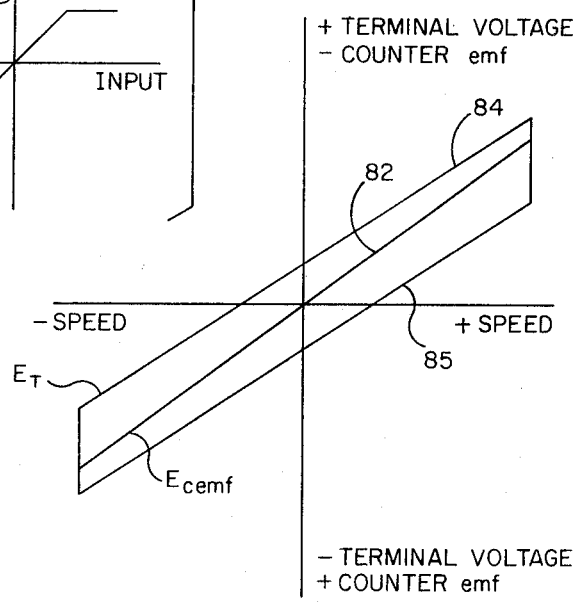

MOTOR ARMATURE CURRENT LIMIT SYSTEM

This invention relates to motor armature current limit circuits for direct current motors, and more particularly to such a circuit which will permit maximum rates of acceleration and deceleration while protecting the motor against commutation difficulties.

Many industrial operations require the use of high speed motors which can accelerate and decelerate at a rapid rate so that no time is wasted between operations of the associated machinery. If an automatic motor control system is used, it will call for the application of a high current to effect the change in speed. Such operation may bring the motor beyond its commutation limit and produce arcs which pit and wear the motor brushes and commutator bars. Operation beyond the commutation limit can cause heavy arcing between the brushes and across the commutator surfaces severely damaging or destroying the motor. Therefore, armature current must be limited during all phases of motor operation.

Safe motor operation within the armature current commutation range is generally achieved by circuitry which fixes the maximum value of standstill armature current. Although the safe commutating current diminishes as armature speed increases, motor counter electromotive force (emf) causes the current to decrease at a greater rate so that it stays well within safe limits. However, the motor consequently operates at less than its maximum acceleration rate and is unable to attain its maximum speed. During motor plugging, i.e., slowing of the motor by the application of reverse torque, the counter emf enhances the armature current so that the established standstill current limit is insufficient to prevent commutation breakdown. Bidirectional motor operation by armature control requires current limit circuitry operative with current passing through the armature in either direction.

It is an object of the present invention to provide a circuit for limiting the armature current of a variable speed direct current motor, the circuit being responsive to a control signal input and providing optimum speed and torque characteristics through forward and reverse motoring and plugging modes of motor operation.

This and other objects of the present invention can be best described with reference to the accompanying drawings, in which:

FIG. 3 is a graph of armature current vs. motor speed showing a motor current limit envelope;

FIG. 4 is a series of graphs labeled A, B, and C showing voltage relations involved in the operation of the current limit circuit of the present invention;

FIG. 5 is a graph showing armature current and motor speed relations involved in the operation of the current limit circuit of the present invention; and FIG. 6 is a graph showing voltage and motor speed relations involved in the operation of the current limit circuit of the present invention.

Figure 1:
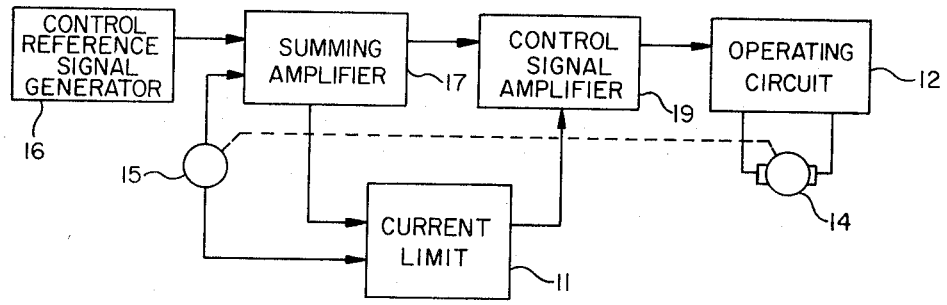
FIG. 1 is a block diagram of a motor control system incorporating the current limit circuit of the present invention.

Referring to FIG. 1, a current limit circuit 11 in accordance with the present invention is shown in connection with an automatic control system for a DC motor having a fixed field. The control system supplies a control signal to an operating circuit 12 which responds to provide an operating voltage to an armature 14 of the motor, the magnitude and polarity of the applied operating voltage determining the magnitude and direction of current through the armature 14. A preferred operating circuit is disclosed in my application Ser. No. 83,074 filed concurrently herewith and assigned to the assignee of the present invention.

The armature 14 is mechanically coupled to a tachometer-generator 15 which generates a DC voltage having a magnitude directly proportional to the motor shaft speed and a polarity depending on the direction of motor rotation. A control reference signal generator 16 produces a DC voltage having a magnitude indicative of the desired motor speed and having a polarity indicative of the desired direction of motor torque. For example, a reference signal of positive voltage could call for a forward motor operation and a reference signal of negative voltage could call for reverse motor operation. The polarity of the voltage signal produced by the tachometer-generator 15 would then be negative during forward operation of the motor and positive during reverse operation of the motor.

The output voltages of the control reference signal generator 16 and the tachometer-generator 15 are transmitted to a summing amplifier 17 which combines the signals to produce an error signal which is in turn transmitted to a control signal amplifier 19. The error signal is amplified to provide a control signal from the amplifier 19 which determines the operation of the operating circuit 12 as described in the aforementioned patent application. The magnitude of this control signal controls the voltage applied to, and resulting current through, the armature 14 and the polarity of the control signal determines whether a forward torque (positive signal) or a reverse torque (negative signal) should be applied.

Figure 2:
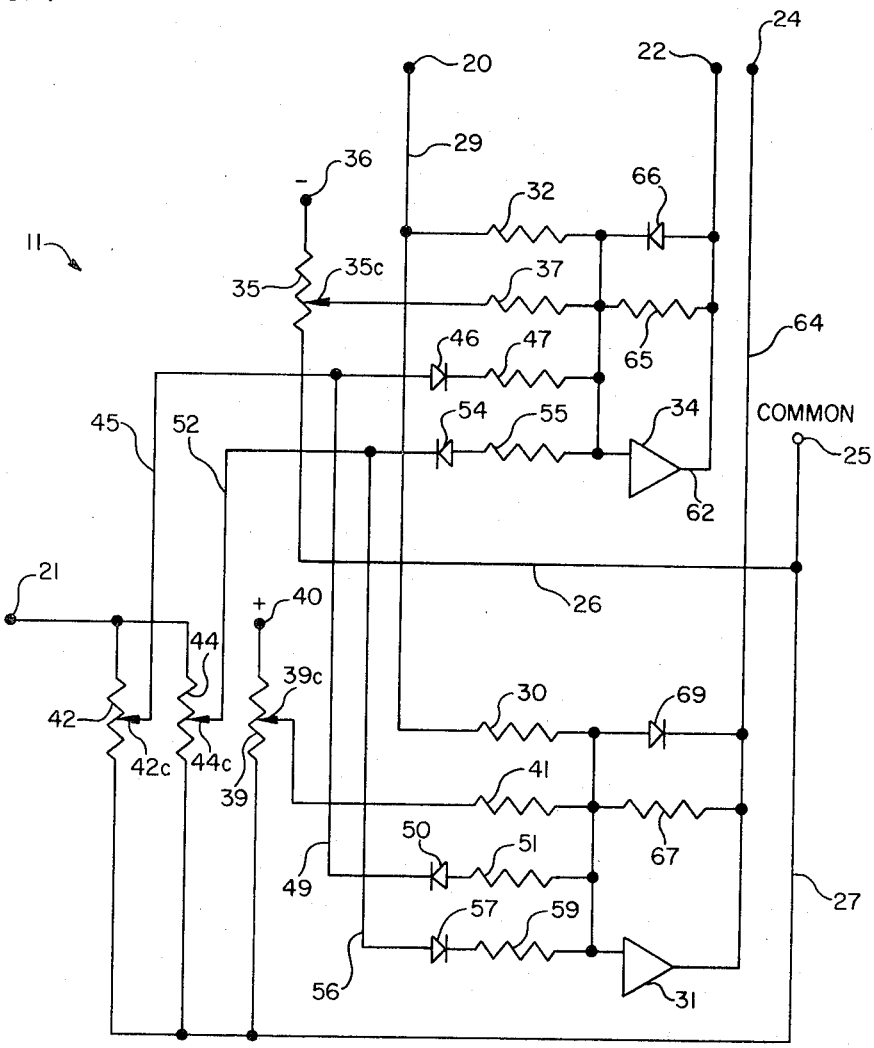
FIG. 2 is a schematic wiring diagram of the current limit circuit of the present invention.

The current limit circuit 11 illustrative of this invention will now be described with reference to FIGS. 1 and 2. The error signal output of the summing amplifier 17 is transmitted to the current limit circuit 11 at a signal input terminal 20. The voltage signal generated by the tachometer-generator 15 enters the current limit circuit 11 at the tachometer input terminal 21. The current limiting signals produced by the current limit circuit 11 are transmitted to the control signal amplifier 19 via signal output terminals 22 and 24. A common terminal 25 connects common conductors 26 and 27 to the control system common.

A conductor 29 connects the signal input terminal 20 through an input resistor 30 to the input of an operational amplifier 31. An input resistor 32 connects the conductor 29 to the input of an operational amplifier 34. The amplifiers 31 and 34 are connected to serve as signal inverting amplifiers; this means that a positive input voltage produces a negative output voltage and that a negative input voltage produces a positive output voltage.

An adjustable resistance means such as a potentiometer 35 having a movable contact 35c is connected between a negative voltage source 36 and the common conductor 26. The movable contact 35c is connected through an input resistor 37 to the input of the amplifier 34. A potentiometer 39 having a movable contact 39c is connected between a positive voltage source 40 and the common conductor 27. The movable contact 39c is connected through an input resistor 41 to the input of the amplifier 31.

The tachometer input terminal 21 is connected to one end of a plugging potentiometer 42, having a movable contact 42c, and to one end of a motoring potentiometer 44, having a movable contact 44c. The other ends of the potentiometers 42 and 44 are connected to the common conductor 27. A conductor 45 connects the movable contact 42c through a unidirectional current conduction means, such as a diode 46, and an input resistor 47 to the input of the amplifier 34 and the conductor 45 is in turn connected by a conductor 49 through a diode 50 and an input resistor 51 to the input of the amplifier 31. The movable contact 44c is connected by a conductor 52 through a diode 54 and an input resistor 55 to the input of the amplifier 34 and the conductor 52 is connected by a conductor 56 through a diode 57 and an input resistor 59 to the input of the amplifier 31.

A pair of conductors 62 and 64 connect the amplifiers 34 and 31 to the output terminals 22 and 24, respectively. A feedback resistor 65 and a clamping diode 66 are connected in parallel across the amplifier 34 and a feedback resistor 67 and a clamping diode 69 are connected in parallel across the amplifier 31.

Operation of the current limit circuit 11 will now be described. The armature 14 is to carry currents for operation in forward and reverse motoring and plugging modes and must be protected from commutation failure in each of the four modes. A desirable motor current limit envelope such as shown in FIG. 3 provides maximum acceleration and deceleration with freedom from commutation failure and has a forward motoring quadrant 70, a plugging from forward quadrant 71, a reverse motoring quadrant 72 and a plugging from reverse quadrant 73. The contour of the envelope is made to approximate maximum armature current permissible during each mode of motor operation. The maximum permissible armature current, as determined by the commutating ability of the motor, decreases as motor speed increases so that the current limit circuit must provide means to keep the armature current just within the perimeter of the envelope under all conditions for optimum motor operation.

When the reference signal to the signal input terminal 20 and the tachometer signal to the tachometer input terminal 21 (FIG. 2) are both zero, the only input to the amplifier 34 is a negative bias voltage from the negative voltage source 36 supplied through the potentiometer 35. Since the amplifier 34 is connected to serve as a signal inverter, the negative input tends to drive the output of the amplifier 34 positive with a signal gain equal to the ratio of the resistance of the feedback resistor 65 to that of the input resistor 37. However, with a positive amplifier output, the clamping diode 66 shorts out the feedback resistor 65 thereby clamping the output of the amplifier 34 at a near-zero voltage of a magnitude determined by the forward drop of the diode 66.

Similarly, the only input to the amplifier 31 is a positive bias voltage from the positive voltage source 40 supplied through the potentiometer 39. Since the amplifier 31 is connected to serve as a signal inverter, the positive input tends to drive the output of the amplifier negative with a signal gain equal to the ratio of the resistance of the feedback resistor 67 to that of the input resistor 41. However, with a negative amplifier output, the clamping diode 69 shorts out the feedback resistor 67 thereby clamping the output of the amplifier 31 at a near-zero voltage of a magnitude determined by the forward drop of the diode 69. The negative output of the amplifier 31 is preferably equal in magnitude to the positive output of the amplifier 34 under zero input conditions.

When the armature 14 is not rotating, so that the tachometer input voltage is zero, and a positive reference signal is applied to the summing amplifier 17 (FIG. 1), this signal is applied to the signal input terminal 20 of the current limit circuit 11. The signal is summed with the bias voltages at the amplifiers 34 and 31 and subtracts from the bias voltage applied to the amplifier 34 and adds to the bias voltage applied to the amplifier 31. The output of the amplifier 31 remains clamped, but when the magnitude of the positive signal input voltage exceeds the bias voltage from the source 36, the summed input to the amplifier 34 becomes positive and the output becomes correspondingly negative. The diode 66 no longer clamps the output of the amplifier 34 and its output increases negatively at the same rate at which the signal input voltage increases positively so that the sum of the input voltages to the control signal amplifier 19 becomes constant. Similarly, a negative reference signal clamps the output of the amplifier 31 and permits an increasing negative voltage from the amplifier 34. Thus, a positive and a negative standstill current limit, shown at 75 and 76, respectively, in FIG. 3, are defined for the armature 14.

A voltage signal output from the summing amplifier 17 (FIG. 1), such as that shown in FIG. 4A, would thus cause the current limit circuit 11 to produce a voltage output such as that shown in FIG. 4B and hereinbefore explained. These voltages signals would be summed by the control signal amplifier 19 to produce the clamped signal shown in FIG. 4C. It can readily be seen from the foregoing explanation that adjustment of the potentiometer 35 determines the positive standstill current limit while adjustment of the potentiometer 39 determines the negative standstill current limit.

When the motor is operating in the forward direction and the output of the control reference signal generator 16 is positive and greater in magnitude than the negative output of the tachometer generator 15, the motor operates in its forward motoring mode (quadrant 70 in FIG. 5). As the motor speed increases, the counter emf of the motor increases so that, even if the applied terminal voltage remains constant, the armature current decreases. The drop in armature current with increasing speed is shown by a curve 77 in FIG. 5. It can be seen that the natural decline in armature current from the standstill current limit is so great that the motor would not even approach its maximum speed. Since optimum operation of the motor requires that the armature current be maintained along the current limit curve 79, the applied terminal voltage must be increased to partially counteract the counter emf of the motor. The counter emf, shown by a curve 82 in FIG. 6, increases with the motor speed so that an applied terminal voltage having a constant magnitude would produce the armature current-speed curve 77 in FIG. 5. To maintain armature current along the perimeter 79 of the current limit envelope when maximum current is called for, the terminal voltage must be increased in a manner such as shown in FIG. 6 by a curve 84. The motor terminal voltage is increased at a rate less than the increase in counter emf, thereby producing a decrease in the net motor voltage which causes the armature current to decrease along the perimeter of the desired envelope. It should be noted, however, that whenever the signal input calls for a current less than the permissible limit, the current limit circuit will cause no changes in the control signal.

The signal input terminal 20 receives a positive voltage and the tachometer input terminal 21 receives a negative voltage during forward motoring operation. The positive signal input voltage clamps the output of the amplifier 31 and tends to overcome the bias voltage applied to the amplifier 34, as previously explained, causing application of a current limiting output. The negative tachometer input voltage is applied through the potentiometer 42 to the diodes 46 and 50 and through the potentiometer 44 to the diodes 54 and 57. The diodes 46 and 57 are so poled that the voltage is blocked and the diodes 50 and 54 are so poled that the voltage is transmitted to the amplifiers 31 and 34, respectively. The magnitude of the negative tachometer input voltage is insufficient to unclamp the amplifier 31 and thus has no effect on its output. However, the negative signal does affect the output of the amplifier 34; it combines with the positive signal input voltage and the negative bias voltage to the input to the amplifier 34.

The combination of the negative tachometer input signal with the negative bias from the potentiometer 35 permits a larger positive voltage to be presented at the signal input terminal 20 before a current limiting output is generated. This means that, for a constant positive input signal, the current limit signal at the output terminal 22 decreases in magnitude as the tachometer input voltage increases. Therefore, as the motor counter emf increases as shown by the curve 82 in FIG. 6, the applied terminal voltage increases as shown by the curve 84. The rate of increase of applied terminal voltage is that required to conform the current taper to the current limit curve 79 in FIG. 5. Conformity of the motoring current curve to the desired current limit envelope during forward motoring operation may be regulated by adjustment of the motoring potentiometer 44.

If, during forward operation of the motor, it is desired to reduce the motor speed or reverse the direction of armature rotation, the output of the control reference signal generator 16 becomes negative thus calling for a reversal of the polarity of the applied terminal voltage for plugging the motor. Should the terminal voltage be reversed, the counter emf would have the same polarity as the terminal voltage and a large current pulse would be sent through the motor, as shown by a curve 80 in FIG. 5. To keep the armature current along the curve 81 in FIG. 5, the applied terminal voltage must be kept positive and its magnitude maintained at a lesser value than that of the counter emf. As motor speed decreases, terminal voltage is decreased, as shown by a curve 85 in FIG. 6, remaining positive until a negative terminal voltage can be applied without producing a current beyond the commutation limit.

During plugging from forward operation, the voltage at the signal input terminal 20 is negative and the voltage at the tachometer input terminal 21 is negative. The negative signal input voltage clamps the output of the amplifier 34 so that only the amplifier 31 can function. The tachometer input is fed through the potentiometer 42 to the diodes 46 and 50 and through the potentiometer 44 to the diodes 54 and 57. The diodes 46 and 57 block the negative voltage and the input through the diode 54 to the amplifier 34 is insufficient to unclamp its output. Therefore, the negative tachometer voltage is summed through the input resistor 51 with the negative input signal voltage and the positive bias voltage for input to the amplifier 31. The added tachometer signal permits a smaller negative voltage at the signal input terminal 20 to generate a current limiting output. Thus, for a constant negative input signal, the current limit signal at the output terminal 24 is greatest during high-speed operation which produces a higher tachometer input voltage. During high-speed plugging, the positive output of the amplifier 31 and thus of the current limit circuit 11 is greater in magnitude than the negative output of the summing amplifier 17 so that the output of the control signal amplifier 19 remains positive. As motor counter emf decreases, the applied terminal voltage decreases finally becoming negative, as shown by the curve 85 in FIG. 6, so that the armature current increases with decreasing motor speed at a rate not greater than that shown by the curve 81 in FIG. 5. Conformity of the plugging current curve to the current limit envelope during forward operation may be regulated by adjustment of the plugging potentiometer 42.

Similar operation occurs during the reverse motoring and plugging from reverse modes of motor operation. During reverse motoring, a negative voltage is applied at the signal input terminal 20 and the tachometer input voltage is positive. Therefore, the output of the amplifier 34 is clamped and the amplifier 31 produces a current limiting signal altered to compensate for the effects of counter emf by the positive tachometer signal applied through the motoring potentiometer 44 and the diode 57. Again the potentiometer 44 provides current taper adjustment.

During plugging from reverse operation, a positive input signal voltage clamps the output of amplifier 31 and unclamps the output of amplifier 34. The positive tachometer voltage applied through the plugging potentiometer 42 and diode 46 alters the current limiting signal to compensate for the motor counter emf. The potentiometer 42 provides adjustment. The ohmic values of the input resistors 47, 55, 51 and 59 may be adjusted or selected to create appropriate gain characteristics to provide the versatility required of the current limit circuit 11 for proper control during all modes of motor operation.

I claim:

1. A control system for a motor having an armature, said control system comprising means combining a control reference voltage and a speed reference voltage to provide a control voltage of selectable magnitude and polarity, means responsive to the magnitude and polarity of an operating voltage to transmit a corresponding current through the armature, current limit means responsive to a predetermined value of said control voltage to produce a current limit voltage having a polarity opposite the polarity of said control voltage and a magnitude substantially equal to the amount by which the magnitude of said control voltage exceeds said predetermined value, and means to combine said control voltage and said current limit voltage to produce said operating voltage, whereby current limit is provided for the armature at standstill and all speeds of the motor.

2. A control system as in claim 1 wherein said current limit means comprises first and second signal inverting amplifier means having input and output terminals, negative biasing means for applying a predetermined negative biasing voltage to the input terminal of said first amplifier means to produce a positive amplifier output, positive biasing means for applying a predetermined positive biasing voltage to the input terminal of said second amplifier means to produce a negative amplifier output, a first clamping means for limiting the positive output of said first amplifier means, a second clamping means for limiting the negative output of said second amplifier means, and a first input means for applying said control voltage to the input terminals of said first and second amplifier means.

3. A control system as in claim 2 wherein each of said first and second amplifier means has a feedback resistor and wherein said first clamping means comprises a unidirectional current conduction means connected in parallel with said first feedback resistor and said second clamping means comprises a unidirectional current conduction means connected in parallel with said second feedback resistor.

4. A control system as in claim 2 including tachometer means coupled to the armature to produce said speed reference voltage, and wherein said current limit means includes a second input means to apply said speed reference voltage to the input terminals of said first and second amplifier means.

5. A control system as in claim 4 wherein the system provides motoring and plugging modes for said motor, and wherein said current limit means includes speed reference adjustment means to permit independent adjustment for said speed reference voltage for each of said motoring and plugging modes.

6. A control system as in claim 5 wherein said speed reference adjustment means comprises first and second adjustable resistance means, said first adjustable resistance means being connected to the input terminal of said first amplifier means through a first unidirectional current conduction means and to the input terminal of said second amplifier means through a second unidirectional current conduction means, said second adjustable resistance means being connected to the input terminal of said first amplifier means through a third unidirectional current conduction means and to the input terminal of said second amplifier means through a fourth unidirectional current conduction means, and wherein said first and fourth unidirectional current conduction means are poled to transmit one polarity of said speed reference voltage and said second and third unidirectional current conduction means are poled to transmit the other polarity of said speed reference voltage.

7. A control system as in claim 2 wherein each of said negative and positive biasing means includes adjustable resistance means.

* * * * *